United States Patent [19]

Fagan, deceased et al.

[11] Patent Number: 5,112,123
[45] Date of Patent: May 12, 1992

[54] MASKING DEVICE FOR OVERHEAD PROJECTOR

[76] Inventors: Robert Fagan, deceased, late of Bethesda; by Ellen Fagan, personal administrator, 7829 Fulbright Ct., Bethesda, Md. 20817

[21] Appl. No.: 705,357

[22] Filed: May 24, 1991

[51] Int. Cl.⁵ .............................. G03B 21/54
[52] U.S. Cl. .................. 353/97; 353/DIG. 5; 353/88; 353/121
[58] Field of Search ............ 353/44, DIG. 5, DIG. 3, 353/88, DIG. 4, 121, 122, 97, 42, 25, 28; 434/365, 428

[56] References Cited

U.S. PATENT DOCUMENTS

| | | | |
|---|---|---|---|
| 3,334,540 | 8/1967 | Wright | 353/DIG. 5 |
| 3,510,214 | 5/1970 | Crow | 353/97 |
| 3,998,535 | 12/1976 | Clarke | 353/DIG. 5 |
| 4,632,529 | 12/1986 | Levin | 353/DIG. 5 |
| 4,688,911 | 8/1987 | Simbal | 353/88 |
| 4,813,780 | 3/1989 | Solyntjes | 353/88 |
| 4,942,411 | 7/1990 | Polston | 353/DIG. 5 |
| 5,013,149 | 5/1991 | Downum et al. | 353/DIG. 5 |
| 5,052,798 | 10/1991 | Mardis | 353/DIG. 3 |

*Primary Examiner*—William A. Cuchlinski, Jr.
*Assistant Examiner*—William C. Dowling
*Attorney, Agent, or Firm*—Thomas S. Hahn; Edward S. Irons

[57] ABSTRACT

A device for selectively masking portions of transparent visual material to be projected by an overhead projector onto a screen including an opaque flexible sheet attached at one side to the overhead projector and at the other to a rod portion of a spool. When not in use the opaque flexible sheet is wound onto the spool. A portion, or all, of the transparent material may be blocked from projection by rolling the spool over the transparent material so that the opaque flexible sheet covers the undesired material.

3 Claims, 1 Drawing Sheet

MASKING DEVICE FOR OVERHEAD PROJECTOR

TECHNICAL FIELD

The present invention relates generally to a device for masking visual material shown on a screen using an overhead projector, and more specifically to a device that can be adjustably positioned on visual material to selectively block portions from being displayed.

BACKGROUND ART

In modern business it is considered routine practice during oral presentations for the speaker to control the audience's attention beyond the spoken word by using an overhead projector to display written, graphical, artistic or other visual material. These overhead projectors only require use of transparent sheets with visual material to be projected imprinted on the transparent sheets. The transparent sheets are typically plastic and measure 8.5×11 inches. This is the same size as business typing paper. Such transparent sheets can for example be individually stored in clear plastic envelopes with three holes punched in a tab on one side of the envelope so the transparent sheets can be conveniently carried in loose leaf notebooks. To use the transparent sheets with an overhead projector they do not even have to be taken out of the clear plastic envelopes. The speaker can stand beside the overhead projector and individually lay each transparent sheet on the overhead projector as needed during the presentation.

Often, though, transparent sheets are made with more material for showing to the audience than the speaker wants projected when the transparent sheet is first put on the overhead projector. The normal practice in such situations is to have the speaker position an opaque sheet over the transparent sheet and move the opaque sheet to uncover only that portion of the transparent sheet with imprinted material that is to be projected. Then at the appropriate times the speaker, or an assistant, moves the opaque sheet so additional imprinted material can be viewed as required. This repositioning of the opaque sheet requires the speaker, if he is to move the opaque sheet, to at a minimum interrupt normal eye and head movement so the transparent sheet and opaque sheet can be seen and the opaque sheet can be accurately moved with respect to the transparent sheet. If an assistant is available, then the speaker does not have to so interrupt the presentation. But in those situations where an assistant is not available the speaker has no choice other than to interrupt the presentation or to use multiple transparent sheets so no transparent sheet includes more material than is to be presented at one time. This option is inefficient and depending on the structure of the presentation can be ineffective because uncovering visual material can be coupled with, for example, suspense in the spoken material to provide dramatic effect.

DISCLOSURE OF INVENTION

To provide a useful masking device for overhead projectors the present invention uses an opaque flexible sheet fastened at one side of the surface where transparent sheets are laid on the overhead projector for projection. Attached to the opposite side of the opaque flexible sheet is a spool that extends the width of opaque flexible sheet. When not in use the opaque flexible sheet is wound onto the spool. Then when a transparent sheet which is to have some of the imprinted material blocked from projection is laid on the overhead projector the spool is rolled over the transparent sheet and the opaque flexible sheet covers that portion, or all, of the transparent sheet not to be projected. As the speaker proceeds with the presentation, the speaker by watching only the projected image can rotate the spool using one hand and can rewind the opaque flexible sheet to uncover additional imported material for projection.

An object of the present invention is to provide an inexpensive and accurate masking device for overhead projectors that can be used by, for example, a speaker during a presentation without having to direct his attention, including eye contact, toward the overhead projector other than to grasp with one hand a spool handle and rotate the spool until additional desired material is projected.

BRIEF DESCRIPTION OF THE DRAWINGS

The various objects, advantages and novel features of the present invention will become more readily apprehended from the following detailed description when taken in conjunction with the appended drawings, in which.

BEST MODE FOR CARRYING OUT THE INVENTION

Figure 1:
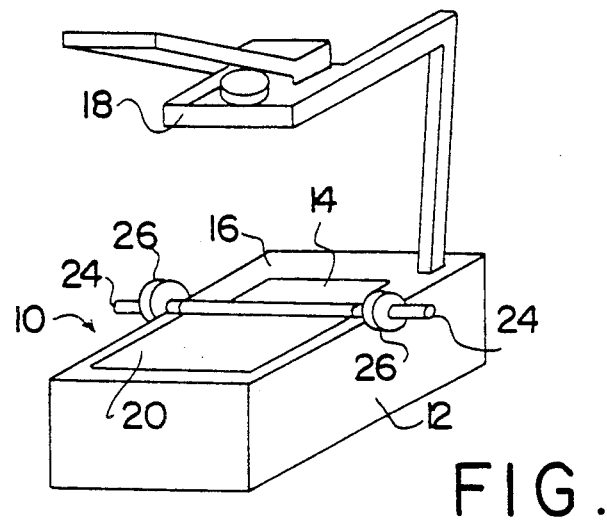
FIG. 1 is a perspective view of an overhead projector including a masking device of the present invention in a half deployed position.

Referring now to the drawings, wherein corresponding components are designated by the same reference numerals throughout the various figures, an overhead projector masking device of the present invention is shown in FIG. 1 and generally designated by reference numeral 10. The overhead projector includes an illuminator source (not shown) housed in compartment 12 for back lighting a transparent sheet 14 laid on a flat surface 16 of the overhead projector. Image information from the backlit transparent sheet 14 is projected to a directing optic 18 that includes a lens and mirror arrangement. Image information from the directing optic 18 is further projected for display on a screen or, as is also often done, any flat neutral colored surface.

Figure 2:
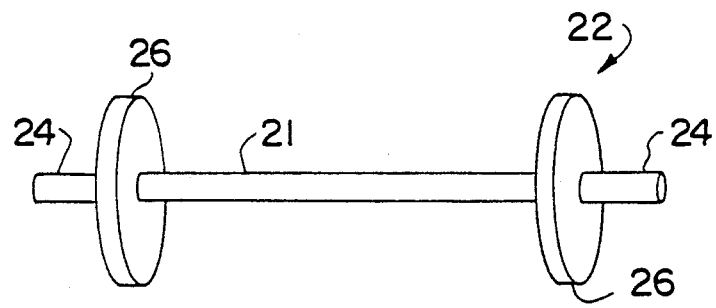
FIG. 2 is a perspective view of only the spool of the masking device of the present invention.

The masking device 10 of the present invention includes an opaque flexible sheet 20 (see, FIG. 1) and a spool 22 (see, FIG. 2). Characteristics for opaque flexible sheet 20 are that one layer blocks light so image information under the opaque flexible sheet 20 can not be projected. Further, the opaque flexible sheet 20 is wound onto the rod 21 of spool 22 so a necessary characteristic of opaque flexible sheet 20 is flexibility such as provided by cloth fabric. These two characteristics, i.e. opacity and flexibility, are inherent with many cloth fabrics such as felt or canvas, and also many dark colored plastics. Any of these materials are satisfactory for use as opaque flexible sheet 20.

As used on an overhead projector, the masking device 10 has one side of the opaque flexible sheet 20 attached adjacent the flat surface 16 where transparent sheets 14 can be positioned for projection. A convenient method for attaching the opaque flexible sheet 20 would be to use the known VELCRO (registered trademark) system of a loop strip and a hook strip (not shown). Either a loop strip or hook strip can be adhesively fixed adjacent the flat surface 16 and the other strip affixed to the side of the opaque flexible sheet 20. Thus the masking device 10 can be removed or mounted on an overhead projector as needed. An appropriate side surface for affixing the opaque flexible sheet 20 to the overhead projector is that side where imprinted material on a transparent sheet 14 that is at the bottom of projected image information is closest. So as the opaque flexible sheet 20 is rewound on the spool 22, more of the imprinted material is displayed until all of the opaque material is rewound and all imprinted material is projected for display. Alternatively, the end of the opaque flexible sheet 20 can be affixed at other sides of the flat surface 16 depending on the needs of the presenter. For example, columns instead of rows of imprinted material can be blocked out by using the masking device 10 of the present invention.

Affixed to the rod 21 of the spool 22 of the present invention is the side of the opaque flexible sheet 20 that is opposite the side affixed to the overhead projector. Attachment to the rod 21 can be, for example, by adhesives or VELCRO (registered trademark) or other suitable means. At each end of the spool 22 are handles 24 that include retaining discs 26. When mounted on an overhead projector, as shown in FIG. 1, the retaining discs 26 of the spool 22 are positioned so they prevent the spool 22 from moving other than straight across the flat surface 16.

With this configuration a speaker can hold either handle 24 of the spool 22 alone and rotate the spool 22 to either rewind or unwind the opaque flexible sheet 20 over a transparent sheet 14. Because of the retaining discs 26 and their positioning on the overhead projector a straight line of fabric will either be advanced or retracted from imprinted material on the transparent sheet 14. This precise adjustment of the opaque flexible sheet is accomplished without requiring the speaker to do any more than rotate a handle 24 in the correct direction. The speaker's visual attention can be directed as best serves the presentation without concern for maintaining the proper orientation of the spool 22 on the flat surface 16.

The above discussion and related illustrations of the present invention are directed primarily to a preferred embodiment and practices of the invention. However, it is believed that numerous changes and modifications in the actual implementation of the concepts described will be apparent to those skilled in the art, and it is contemplated that such changes and modifications may be made without departing from the scope of the invention as defined by the following claims.

I claim:

1. A masking device for overhead projectors comprising: an opaque flexible sheet means that has sufficient surface area to cover all imprinted material on transparent sheets positioned on said overhead projector for projection of said imprinted material, one side of said opaque flexible sheet means attached to said overhead projector so said opaque flexible sheet means can be positioned over said transparent sheet to prevent projection of said imprinted material; and a spool means with a side of said opaque flexible sheet means opposite said side attached to said overhead projector being attached to a rod of said spool means.

2. A masking device according to claim 1, including a first retaining disc means positioned at one end of said spool means and a second retaining disc means positioned at the opposite end of said spool means so when said spool means is positioned on said overhead projector and over said transparent sheet, said first retaining disc means and said second retaining disc means are in loose contact with sides of said overhead projector so said spool means is restrained angular movement by contact between said sides of said overhead projector and said retaining discs means.

3. A method for covering and uncovering imprinted material on transparent sheets that is displayed from an overhead projector, comprising the steps of:
   positioning an opaque flexible sheet means over said transparent sheet with one side of said opaque flexible sheet means attached to said overhead projector and the opposite side of said opaque flexible sheet means attached to a spool means; and
   rotating a handle on said spool means to wind said flexible sheet means onto said spool means to uncover said transparent sheet.

* * * * *